(12) United States Patent  (10) Patent No.: US 8,012,640 B2
Ozeki et al.  (45) Date of Patent: Sep. 6, 2011

(54) METHOD FOR OPERATING FUEL-CELL ELECTRICITY-GENERATING DEVICE

(75) Inventors: Masataka Ozeki, Osaka (JP); Akinari Nakamura, Osaka (JP); Shinji Miyauchi, Nara (JP)

(73) Assignee: Panasonic Corporation, Osaka (JP)

( * ) Notice: Subject to any disclaimer, the term of this patent is extended or adjusted under 35 U.S.C. 154(b) by 38 days.

(21) Appl. No.: 12/484,386

(22) Filed: Jun. 15, 2009

(65) Prior Publication Data

US 2009/0253004 A1  Oct. 8, 2009

Related U.S. Application Data

(63) Continuation of application No. 10/500,274, filed as application No. PCT/JP03/05983 on May 14, 2003, now abandoned.

(30) Foreign Application Priority Data

May 15, 2002 (JP) ................................. 2002-140567

(51) Int. Cl.
 *H01M 8/04* (2006.01)
(52) U.S. Cl. .......................... 429/441; 429/428; 429/430
(58) Field of Classification Search .................. 429/428, 429/430, 441
See application file for complete search history.

(56) References Cited

U.S. PATENT DOCUMENTS

| | | | |
|---|---|---|---|
| 4,642,273 A * | 2/1987 | Sasaki | 429/22 |
| 5,989,739 A | 11/1999 | Zur Megede et al. | |
| 6,797,418 B1 | 9/2004 | Nomura et al. | |
| 2002/0051899 A1 | 5/2002 | Keskula et al. | |

FOREIGN PATENT DOCUMENTS

| | | |
|---|---|---|
| JP | 61-267273 A | 11/1986 |
| JP | 63-292575 A | 11/1988 |
| JP | 03-297066 A | 12/1991 |
| JP | 04-123766 A | 4/1992 |
| JP | 06-215790 A | 8/1994 |
| JP | 07-263007 A | 10/1995 |
| JP | 07-296834 A | 11/1995 |
| JP | 08-045521 A | 2/1996 |
| JP | 11-130403 A | 5/1999 |
| JP | 2001-176528 | 6/2001 |
| WO | WO 01/92050 A1 | 12/2001 |

OTHER PUBLICATIONS

Supplementary European Search Report for EP 03 72 8070, Oct. 26, 2007, Panasonic Corportation.
Japanese International Search Report for PCT/JP03/05983, Oct. 7, 2003, Panasonic Corporation.

* cited by examiner

*Primary Examiner* — Gregg Cantelmo
*Assistant Examiner* — Eugenia Wang
(74) *Attorney, Agent, or Firm* — RatnerPrestia

(57) ABSTRACT

A stable and high reliability fuel cell electricity-generating device capable of generating electricity even in the case of sudden drop of load power. A fuel cell generating electric power from a fuel and an oxidizer, a fuel processor producing fuel to be supplied into the fuel cell from an electricity-generating material, a combustion device combusting a residual fuel gas unconsumed in the fuel cell to raise the temperature of the fuel processor, and an electric power generation instructing means of determining the electric power generated by the fuel cell, wherein when the electric power generation instructing means decreases the electric power generated by the fuel cell depending on the decrease of load power to be supplied, the rate at which the generated electric power is decreased is made different depending on the change of the temperature of the fuel processor.

4 Claims, 9 Drawing Sheets

METHOD FOR OPERATING FUEL-CELL ELECTRICITY-GENERATING DEVICE

This application is a continuation of U.S. patent application Ser. No. 10/500,274, now abandoned filed Jun. 28, 2004, which is a U.S. National Phase Application of PCT International Application PCT/JP2003/05983, filed May 14, 2003, the entire disclosures of which are incorporated herein by reference.

TECHNICAL FIELD

The present invention relates to a fuel cell electricity-generating device, and a fuel cell electricity-generating method which generate electricity using a fuel cell.

BACKGROUND ART

A prior art fuel cell electricity-generating device will be described hereinafter.

As shown in FIG. 9, a prior art fuel cell electricity-generating device has a fuel cell 1 of generating electricity with a fuel gas and an oxidizer, a fuel processor 2 of producing a fuel rich in hydrogen from an electricity-generating material comprising water incorporated in a natural gas or the like, a combustion device 3 of combusting a residual fuel gas discharged from the fuel cell 1, a blower 4 of supplying air into the fuel cell 1 as an oxidizer, an electric power generation instructing means 5 of adjusting the electric power generated by the fuel cell 1 and an electricity-generating material adjusting device 6 of adjusting the amount of electricity-generating material and water to be supplied into the fuel processor 2.

The fuel processor 2 comprises a fuel producing means of producing a fuel to be supplied into the fuel cell 1 and a carbon oxide removing means of reducing the content of carbon monoxide in the fuel gas to an extent such that the catalyst of the fuel cell 1 is not damaged.

The combustion device 3 receives the residual fuel gas discharged from the fuel cell 1 and combusts the residual fuel gas to raise the temperature of the fuel producing means of the fuel processor 2 to a temperature at which the fuel producing means of the fuel processor 2 can efficiently produce a fuel gas (about 700° C.).

The electricity-generating material adjusting device 6 adjusts the amount of the electricity-generating material to be supplied into the fuel processor 2 so that the fuel gas can be supplied into the fuel cell 1 in an amount required to generate the electric power determined by the electric power generation instructing means 5.

The electricity-generating material adjusting device 6 also adjusts the temperature of the fuel processor 2 by changing the amount of the electricity-generating material to be supplied into the fuel processor 2. When the temperature of the fuel processor 2 is raised, the amount of the electricity-generating material to be supplied into the fuel processor 2 is reduced to reduce the amount of the residual fuel gas to be supplied into the combustion device 3 and hence the amount of combustion in the combustion device 3 is reduced, thereby lowering the temperature of the fuel processor 2.

On the contrary, when the temperature of the fuel processor 2 is lowered, the electricity-generating material adjusting device 6 increases the amount of the electricity-generating material to be supplied into the fuel processor 2 to increase the amount of the residual fuel gas to be supplied into the combustion device 3 and hence the amount of combustion in the combustion device 3 is increased, thereby raising the temperature of the fuel processor 2.

In a fuel cell electricity-generating device such as the aforementioned prior art example, the carbon monoxide removing means provided in the fuel processor 2 performs effectively its function of removing carbon monoxide normally at from about 200° C. to about 300° C. In other words, the fuel processor 2 comprises in combination a fuel producing means which works at about 700° C. and a carbon monoxide removing means which works at from about 200° C. to about 300° C. and thus avoids sudden change of the supplied amount of the electricity-generating material so that the temperature of the two means are well balanced.

On the other hand, the electric power generation instructing means 5 changes the generated electric power successively depending on the load power to be supplied by the fuel cell electricity-generating device. Since the load power changes momentarily, it is desirable that the change of the supplied amount of the electricity-generating material be at the same time as the change of the load power to effect efficient generation of electricity.

Referring thus to a realistic method of supplying the electricity-generating material, when it is desired to raise the generated electric power, the generated electric power is raised at the same rate as that at which the amount of the electricity-generating material to be supplied into the fuel processor 2 is raised at a maximum rate at which the amount of the electricity-generating material can be raised (about 20 minutes needed to reach from 50% of rated output to rated output) because when the electricity-generating material runs short, the generated electric power cannot be raised.

On the other hand, when it is desired to lower the generated electric power, a process is employed which comprises suddenly lowering the generated electric power so that the amount of the residual fuel gas to be discharged from the fuel cell is transiently increased, and then decreasing the supplied amount of the electricity-generating material.

However, when the generated electric power is suddenly decreased to increase the amount of the residual fuel gas to be discharged from the fuel cell as mentioned above, the residual fuel gas is then supplied into the combustion device 3 to suddenly increase the amount of combustion in the combustion device 3 in a short period of time, causing abnormal rise of the temperature of the fuel processor 2 that makes it necessary that the operation of the fuel cell electricity-generating device be suspended. This not only deteriorates the durability of the fuel processor 2 but also leads to the damage of the fuel processor 2 in the worst case.

DISCLOSURE OF THE INVENTION

An object of the present invention is to provide a fuel cell electricity-generating device, and a fuel cell electricity-generating method which are not subject to abnormal rise of the temperature of the fuel processor and hence deterioration of the durability or damage of the fuel processor even if the load power shows sudden drop taking into account these problems of the prior art fuel cell electricity-generating device.

To solve the above problem, a first aspect of the present invention is a fuel cell electricity-generating device comprising:

a fuel cell of generating electric power from a fuel and an oxidizer, a fuel processor of producing a fuel to be supplied into said fuel cell from an electricity-generating material, a combustion device of combusting a residual fuel gas unconsumed in said fuel cell to raise the temperature of said fuel processor, and an electric power generation instructing means of determining the electric power generated by said fuel cell, wherein when said electric power generation instructing means decreases the electric power generated by said fuel cell depending on the decrease of load power to be supplied, the rate at which the generated electric power is decreased is made different depending on the change of the temperature of the fuel processor.

Further, a second aspect of the present invention is the fuel cell electricity-generating device as in the first aspect, wherein the generated electric power is decreased at a rate with a predetermined upper-limit while the temperature of said fuel processor is rising but at unlimited rate while the temperature of said fuel processor is not rising.

Further, a third aspect concerns a fuel cell electricity-generating device comprising:

a fuel cell of generating electric power from a fuel and an oxidizer, a fuel processor of producing a fuel to be supplied into said fuel cell from an electricity-generating material, a combustion device of combusting a residual fuel gas unconsumed in said fuel cell to raise the temperature of said fuel processor, and an electric power generation instructing means of determining the electric power generated by said fuel cell, wherein when said electric power generation instructing means decreases the electric power generated by said fuel cell depending on the decrease of load power to be supplied, the rate at which the generated electric power is decreased is made different depending on the temperature of the fuel processor.

Moreover, a fourth aspect concerns the fuel cell electricity-generating device of the third aspect wherein a mode of preventing the decrease of generated electric power (first power limitation mode) is executed when the temperature of said fuel processor is not lower than a first threshold value and the rate at which the generated electric power is decreased is not limited when the temperature of said fuel processor is not higher than a second threshold value which is lower than the first threshold value.

Further, a fifth aspect concerns the fuel cell electricity-generating device of the fourth aspect wherein said first power limitation mode is released when said electric power generation instructing means maintains or begins to raise the electric power generated by said fuel cell.

Moreover, a sixth aspect concerns the fuel cell electricity-generating device of the third aspect wherein a mode of decreasing the generated electric power at a rate with a predetermined upper limit (second power limitation mode) is executed when the temperature of said fuel processor is not lower than a third threshold value, and the rate at which the generated electric power is decreased is not limited when the temperature of said fuel processor is not higher than a fourth threshold value which is lower than the third threshold value.

Further, a seventh aspect concerns the fuel cell electricity-generating device of the sixth aspect wherein said second power limitation mode is released when said electric power generation instructing means maintains or begins to raise the electric power generated by said fuel cell.

Moreover, an eighth aspect concerns the fuel cell electricity-generating device of the third aspect wherein a mode of preventing the decrease of generated electric power (first power limitation mode) is executed when the temperature of said fuel processor is not lower than the first threshold value, a mode of decreasing the generated electric power at a rate with a predetermined upper limit (second power limitation mode) is executed when the temperature of said fuel processor is not higher than the second threshold value, which is lower than said first threshold value and the rate at which the generated electric power is decreased is not limited when the temperature of said fuel processor is not higher than the fourth threshold value which is lower than the second threshold value.

Further, a ninth aspect concerns the fuel cell electricity-generating device of the eighth aspect wherein both of said first and second power limitation modes are released when said electric power generation instructing means maintains or begins to raise the electric power generated by said fuel cell.

Moreover, a tenth aspect concerns a fuel cell electricity-generating method of generating electricity using a fuel cell electricity-generating device comprising:

a fuel cell of generating electric power from a fuel and an oxidizer, a fuel processor of producing a fuel to be supplied into said fuel cell from an electricity-generating material, a combustion device of combusting a residual fuel gas unconsumed in said fuel cell to raise the temperature of said fuel processor, and an electric power generation instructing means of determining the electric power generated by said fuel cell, wherein there is provided a step of making the rate at which the generated electric power is decreased different depending on the change of the temperature of the fuel processor when said electric power generation instructing means decreases the electric power generated by said fuel cell depending on the decrease of load power to be supplied.

Further, an eleventh aspect concerns a fuel cell electricity-generating method of generating electricity using a fuel cell electricity-generating device comprising:

a fuel cell of generating electric power from a fuel and an oxidizer, a fuel processor of producing a fuel to be supplied into said fuel cell from an electricity-generating material, a combustion device of combusting a residual fuel gas unconsumed in said fuel cell to raise the temperature of said fuel processor, and an electric power generation instructing means of determining the electric power generated by said fuel cell, wherein there is provided a step of making the rate at which the generated electric power is decreased different depending on the temperature of the fuel processor when said electric power generation instructing means decreases the electric power generated by said fuel cell depending on the decrease of load power to be supplied.

Thus, in the present invention, the generated electric power determined by the electric power generation instructing means of determining the electric power generated by the fuel cell is limited depending on the temperature of the fuel producing means of the fuel processor of producing a fuel to be supplied into the aforementioned fuel cell from an electricity-generating material, preventing abnormal rise of the temperature of the fuel processor even in the case of sudden drop of load power and hence the deterioration of durability or damage of the fuel processor.

DESCRIPTION OF REFERENCE NUMERALS AND SIGNS

Figure 1:
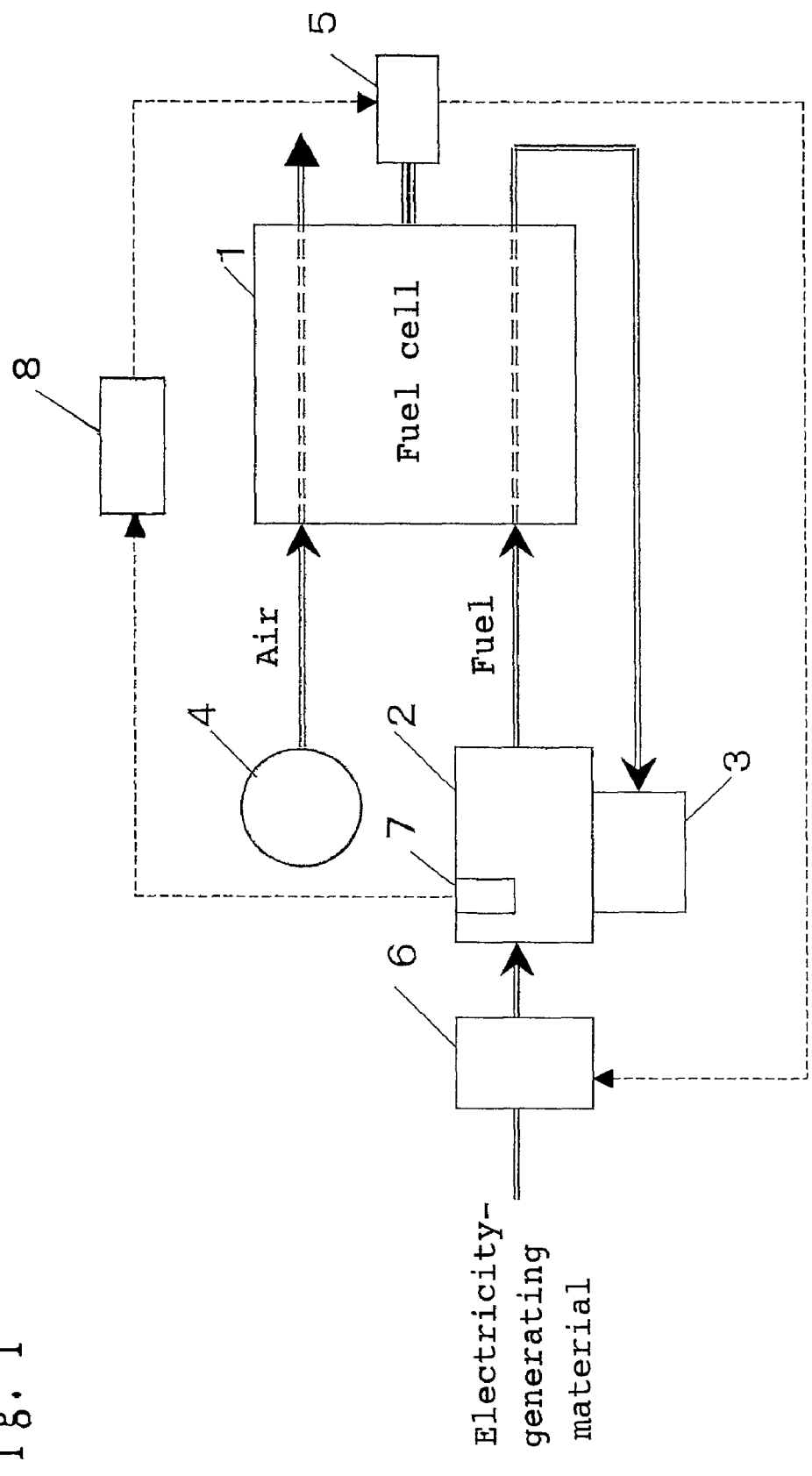
FIG. 1 is a configurational diagram illustrating a fuel cell electricity-generating device according to a first embodiment of implementation of the present invention.

1 Fuel cell
2 Fuel processor
3 Combustion device
4 Blower
5 Electric power generation instructing means
6 Electricity-generating material adjusting device
7 Temperature sensing means
8 Temperature comparing means

BEST MODE FOR CARRYING OUT THE INVENTION

Embodiments of implementation of the present invention will be described hereinafter in connection with the drawings.

First Embodiment

FIG. 1 illustrates one of embodiments of implementation of the present invention. Where the constituent elements are the same as those of the prior art example, the same numbers are used.

The fuel cell electricity-generating device according to an embodiment of implementation of the present invention has a fuel cell 1 of generating electricity with a fuel gas and an oxidizer, a fuel processor 2 of producing a fuel rich in hydrogen from an electricity-generating material comprising water incorporated in a natural gas or the like, a combustion device 3 of combusting a residual fuel gas discharged from the fuel cell 1, a blower 4 of supplying air into the fuel cell 1 as an oxidizer, an electric power generation instructing means 5 of adjusting the electric power generated by the fuel cell 1, an electricity-generating material adjusting device 6 of adjusting the amount of electricity-generating material and water to be supplied into the fuel processor 2, a temperature sensing means 7 of sensing the temperature of the fuel producing means of the fuel processor 2 and a temperature comparing means 8 of comparing the temperature detected at different points of time to judge to see if the temperature of the fuel producing means of the fuel processor 2 is rising or falling or kept unchanged.

The fuel processor 2 comprises a fuel producing means of producing a fuel to be supplied into the fuel cell 1 and a carbon monoxide removing means of reducing the content of carbon monoxide in the fuel gas to an extent such that the catalyst of the fuel cell 1 is not damaged.

The temperature sensing means 7 senses the temperature of the fuel producing means of the fuel processor 2.

The temperature comparing means 8 compares the temperature detected at different points of time to judge to see if the temperature of the fuel producing means of the fuel processor 2 is rising or falling or kept unchanged and then outputs the results of judgment to the electric power generation instructing means 5.

The combustion device 3 receives the residual fuel gas discharged from the fuel cell 1 and combusts the residual fuel gas to raise the temperature of the fuel producing means of the fuel processor 2 to a temperature at which the fuel producing means of the fuel processor 2 can efficiently produce a fuel gas (about 700° C.).

The electricity-generating material adjusting device 6 adjusts the amount of the electricity-generating material to be supplied into the fuel processor 2 so that the fuel gas can be supplied into the fuel cell 1 in an amount required to generate the electric power determined by the electric power generation instructing means 5.

The electricity-generating material adjusting device 6 also changes the amount of the electricity-generating material to be supplied into the fuel processor 2 to adjust the temperature of the fuel processor 2. When the temperature of the fuel processor 2 is raised, the amount of the electricity-generating material to be supplied into the fuel processor 2 is reduced to reduce the amount of the residual fuel gas to be supplied into the combustion device 3 and hence the amount of combustion in the combustion device 3, causing the drop of the temperature of the fuel processor 2. When the temperature of the fuel processor 2 is lowered, the electricity-generating material adjusting device 6 increases the amount of the electricity-generating material to be supplied into the fuel processor 2 to increase the amount of the residual fuel gas to be supplied into the combustion device 3 and hence the amount of combustion in the combustion device 3, causing the rise of the temperature of the fuel processor 2.

Figure 2:
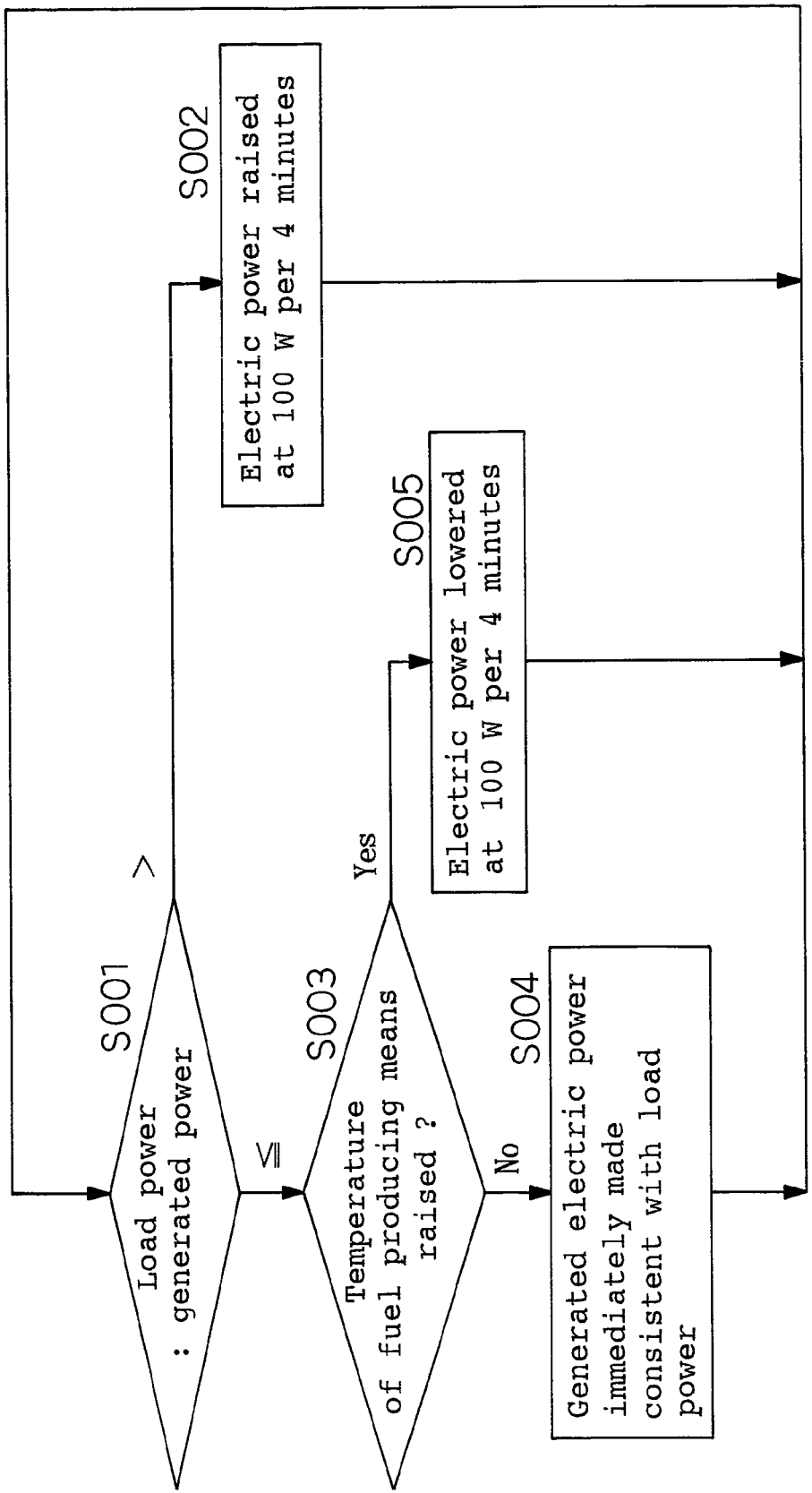
FIG. 2 is a flow chart illustrating the operational state of an electric power generation instructing means 5 according to the first embodiment of implementation of the present invention.

FIG. 2 is a flow chart illustrating the algorithm through which the electric power generation instructing means 5 according to an embodiment of implementation of the present invention changes the generated electric power.

The electric power generation instructing means 5 compares the electric power generated by the fuel cell electricity-generating device with the load power to be supplied (S001). When the load power is greater than the electric power generated by the fuel cell electricity-generating device, the generated electric power is then raised at an upper limit of rate at which the supplied amount of the electricity-generating material can be raised without breaking the temperature balance of the fuel processor 2 (about 20 minutes are required to reach from 50% of rated output to rated output)(S002). When the rated output of the fuel cell electricity-generating device is 1 kW, the electric power is raised at a rate of 100 W per 4 minutes. At the same time, the electricity-generating material adjusting device 6 increases the supplied amount of the electricity-generating material at a rate that the amount corresponding to 100 W is increased per 4 minutes so as to supply the electricity-generating material in an amount required to generate the desired electric power.

On the other hand, when the load power to be supplied is smaller than the electric power generated by the fuel cell electricity-generating device, the electric power generation instructing means 5 detects to see if the temperature of the fuel producing means of the fuel processor 2 is rising (S003). If the temperature of the fuel producing means of the fuel processor 2 is falling or remains unchanged, the electric power generation instructing means 5 judges that the fuel processor 2 shows no abnormal temperature rise even when the amount of the residual fuel gas discharged from the fuel cell 1 increases and then immediately changes the electric current withdrawn from the fuel cell to cause the generated electric power to coincide with the load power (S004). At the same time, the electricity-generating material adjusting device 6 decreases the supplied amount of the electricity-generating material at a rate that the amount corresponding to 100 W is decreased per 4 minutes.

While the temperature of the fuel producing means of the fuel processor 2 is rising, the electric power generation instructing means 5 judges a fear that the amount of the residual fuel gas discharged from the fuel cell 1 increases to cause abnormal rise of the temperature of the fuel processor 2 and then decreases the electric power at a rate of 100 W per 4 minutes, which is the same as the rate at which the electricity-generating material adjusting device 6 decreases the amount of the electricity-generating material (S005). As a result, the generated electric power gradually approaches to the load power to be supplied.

As mentioned above, in the case where it is desired to lower the generated electric power in the fuel cell electricity-generating device, when the temperature of the fuel producing means of the fuel processor 2 is falling or remains unchanged, the electric power generation instructing means 5 immediately causes the generated electric power to coincide with the load power. When the temperature of the fuel producing means of the fuel processor 2 is rising, the electric power generation instructing means 5 decreases the generated electric power at the same rate as the rate at which the electricity-generating material is decreased. In this manner, when it is little likely that the temperature of the fuel processor 2 can rise abnormally, a high efficiency electricity generation can be realized. When it is likely that the temperature of the fuel processor 2 can rise abnormally, the rise of the temperature of the fuel processor 2 can be inhibited, making it possible to prevent unnecessary suspension of the operation of the fuel cell electricity-generating device or avoid deterioration of durability of the fuel processor 2 and even damage of the fuel processor 2.

Second Embodiment

Next, the second embodiment of implementation of the present invention will be described in connection with the drawings.

Figure 3:
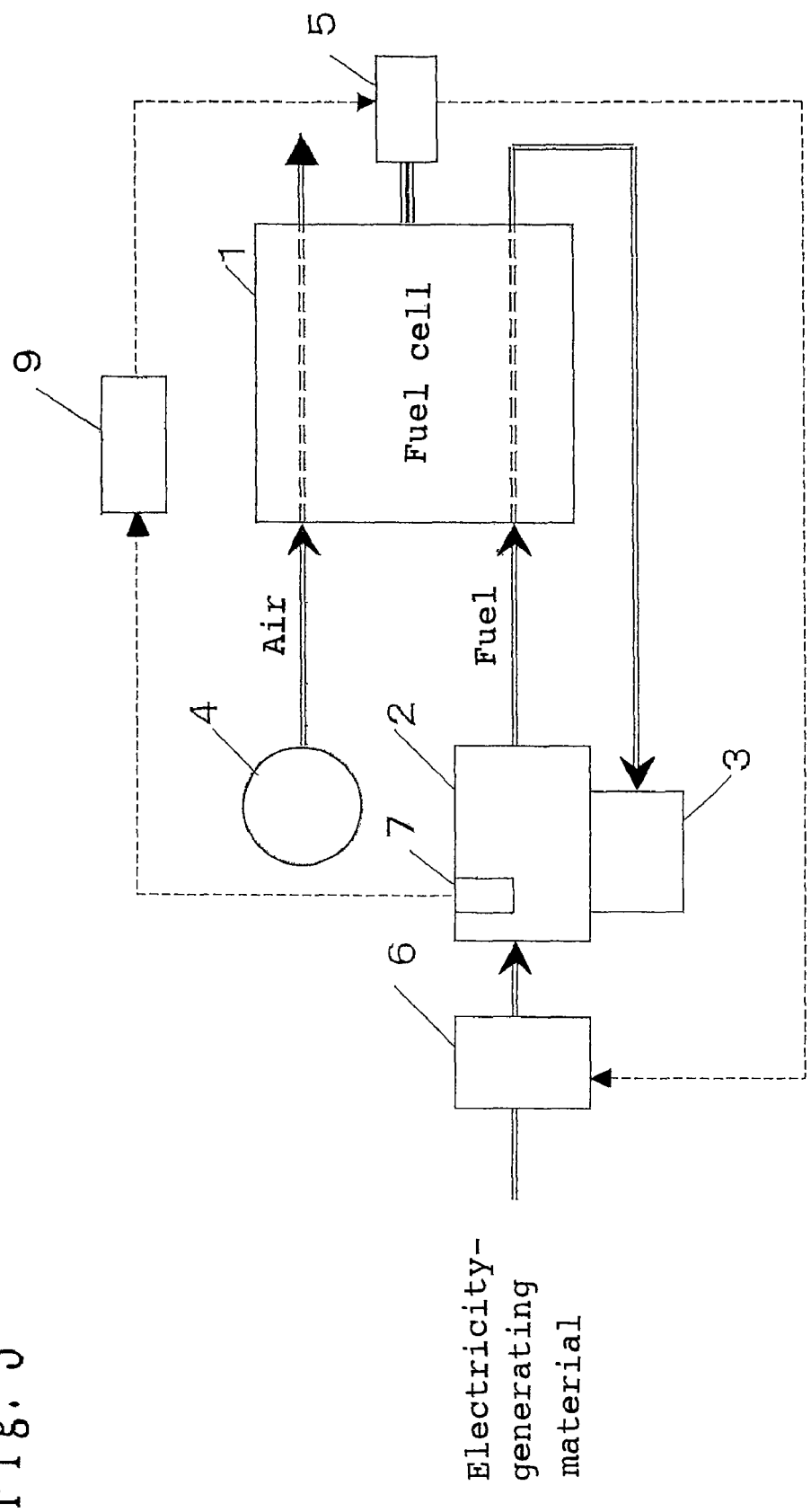
FIG. 3 is a configurational diagram illustrating a fuel cell electricity-generating device according to a second embodiment of implementation of the present invention.

The configuration of the fuel cell system according to the second embodiment of implementation of the present invention is shown in FIG. 3. Where the parts are the same as those of the fuel cell system according to the first embodiment, the same numbers are used and their detailed description are omitted.

The fuel cell electricity-generating device according to the present invention has a fuel cell 1 of generating electricity with a fuel gas and an oxidizer, a fuel processor 2 of producing a fuel rich in hydrogen from an electricity-generating material comprising water incorporated in a natural gas or the like, a combustion device 3 of combusting a residual fuel gas discharged from the fuel cell 1, a blower 4 of supplying air into the fuel cell 1 as an oxidizer, an electric power generation instructing means 5 of adjusting the electric power generated by the fuel cell 1, an electricity-generating material adjusting device 6 of adjusting the amount of electricity-generating material and water to be supplied into the fuel processor 2, a temperature sensing means 7 of sensing the temperature of the fuel producing means of the fuel processor 2 and a temperature comparing means 9 of comparing the temperature detected by the temperature sensing means 7 with first, second, third and fourth threshold values described later, respectively, to judge to see if the temperature detected by the temperature sensing means 7 is higher or not higher than the various threshold values.

The fuel processor 2 comprises a fuel producing means of producing a fuel to be supplied into the fuel cell 1 and a carbon monoxide removing means of reducing the content of carbon monoxide in the fuel gas to an extent such that the catalyst of the fuel cell 1 is not damaged.

The temperature sensing means 7 senses the temperature of the fuel producing means of the fuel processor 2.

The temperature comparing means 9 compares the temperature detected by the temperature sensing means 7 with the first, second, third and fourth threshold values to judge to see if the temperature detected by the temperature sensing means 7 is higher or not higher than the various threshold values and then outputs the results of judgment to the electric power generation instructing means 5.

The combustion device 3 receives the residual fuel gas discharged from the fuel cell 1 and combusts the residual fuel gas to raise the temperature of the fuel producing means of the fuel processor 2 to a temperature at which the fuel producing means of the fuel processor 2 can efficiently produce a fuel gas (about 700° C.).

The electricity-generating material adjusting device 6 adjusts the amount of the electricity-generating material to be supplied into the fuel processor 2 so that the fuel gas can be supplied into the fuel cell 1 in an amount required to generate the electric power determined by the electric power generation instructing means 5.

The electricity-generating material adjusting device 6 also changes the amount of the electricity-generating material to be supplied into the fuel processor 2 to adjust the temperature of the fuel processor 2. When the temperature of the fuel processor 2 is raised, the amount of the electricity-generating material to be supplied into the fuel processor 2 is reduced to reduce the amount of the residual fuel gas to be supplied into the combustion device 3 and hence the amount of combustion in the combustion device 3, causing the drop of the temperature of the fuel processor 2. When the temperature of the fuel processor 2 is lowered, the electricity-generating material adjusting device 6 increases the amount of the electricity-generating material to be supplied into the fuel processor 2 to increase the amount of the residual fuel gas to be supplied into the combustion device 3 and hence the amount of combustion in the combustion device 3, causing the rise of the temperature of the fuel processor 2.

Figure 4:
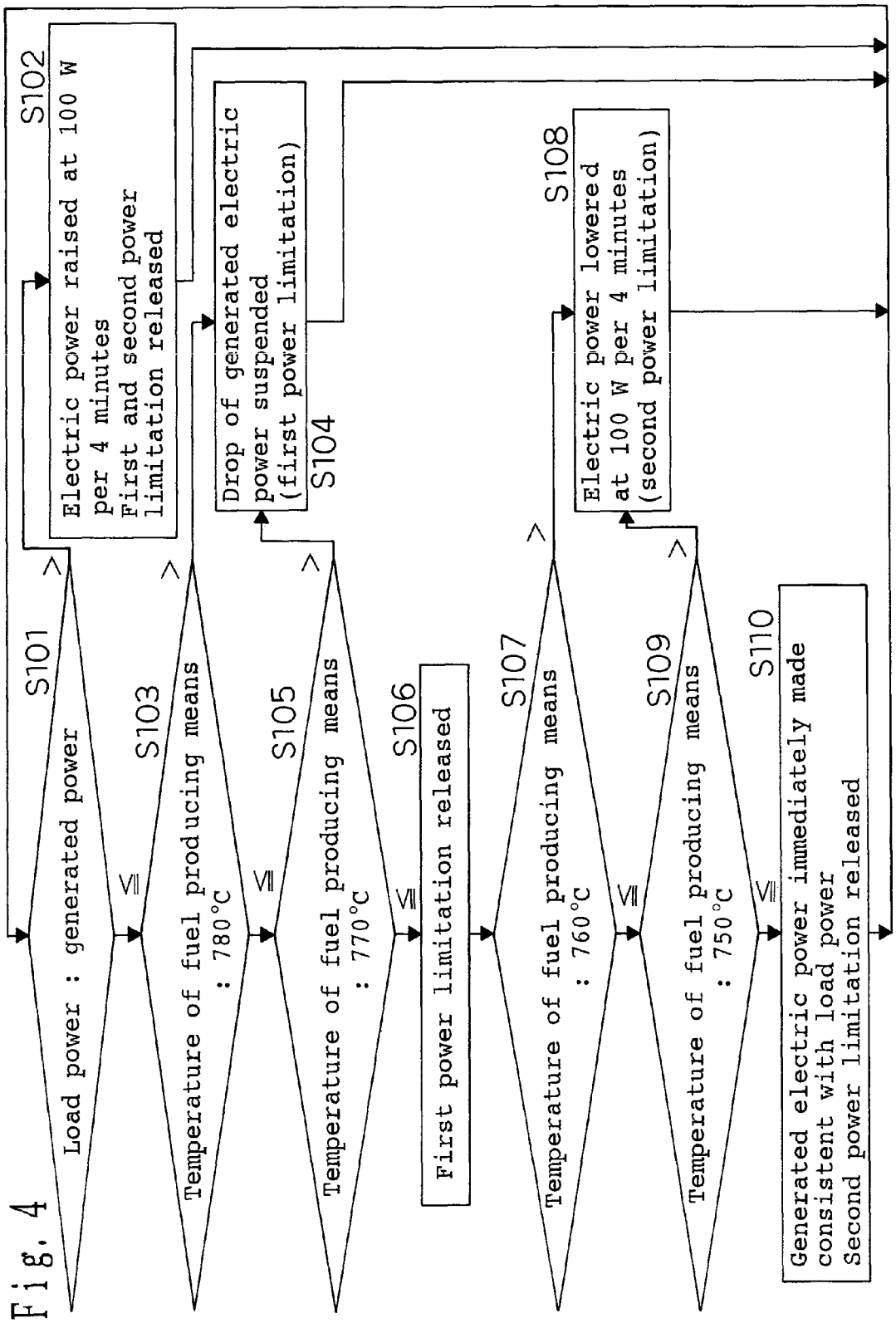
FIG. 4 is a flow chart illustrating the operational state of an electric power generation instructing means 5 according to the second embodiment of implementation of the present invention.

FIG. 4 is a flow chart illustrating the algorithm through which the electric power generation instructing means 5 according to an embodiment of implementation of the present invention changes the generated electric power.

The electric power generation instructing means 5 compares the electric power generated by the fuel cell electricity-generating device with the load power to be supplied (S101). When the load power is greater than the electric power generated by the fuel cell electricity-generating device, the generated electric power is then raised at an upper limit of rate at which the supplied amount of the electricity-generating material can be raised without breaking the temperature balance of the fuel processor 2 (about 20 minutes are required to reach from 50% of rated output to rated output)(S102). When the rated output of the fuel cell electricity-generating device is 1 kW, the electric power is raised at a rate of 100 W per 4 minutes. At the same time, the electricity-generating material adjusting device 6 increases the supplied amount of the electricity-generating material at a rate that the amount corresponding to 100 W is increased per 4 minutes so as to supply the electricity-generating material in an amount required to generate the desired electric power. When first and second power limitation modes described later are executed, the power limitation mode which is executed at the same time during this process is released.

On the other hand, when the load power to be supplied is smaller than the electric power generated by the fuel cell electricity-generating device in S101, the electric power generation instructing means 5 compares the temperature of the fuel producing means of the fuel processor 2 with a first threshold temperature (about 780° C.) calculated from the temperature (about 800° C.) at which the catalyst of the fuel producing means is deteriorated taking into account safety (about 20° C.) (S103). If the temperature of the fuel producing means of the fuel processor 2 is higher than the first threshold temperature (about 780° C.), the electric power generation instructing means 5 prevents the decrease of the generated electric power in the first power limitation mode (S104). At the same time, the electricity-generating material adjusting device 6 decreases the supplied amount of the electricity-generating material at a rate that the amount corresponding to 100 W is reduced per 4 minutes.

When the temperature of the fuel producing means of the fuel processor 2 is not higher than the first threshold temperature (about 780° C.) in S103, the electric power generation instructing means 5 compares the temperature of the fuel producing means of the fuel processor 2 with a second threshold temperature (about 770° C.) (S105). If the temperature of the fuel producing means of the fuel processor 2 is not higher than the second threshold temperature (about 770° C.), the first power limitation mode is released (S106). On the other hand, if the temperature of the fuel producing means of the fuel processor 2 is higher than the second threshold temperature (about 770° C.) in S105, the first power limitation mode is not released even if the first power limitation mode has been already executed. The second threshold temperature is determined taking into account the rate of change of temperature of the fuel producing means of the fuel processor 2 so that the execution/release of the first power limitation mode doesn't occur little by little but may be normally predetermined to be about 10° C. lower than the first threshold temperature.

Further, the electric power generation instructing means 5 compares the temperature of the fuel producing means of the fuel processor 2 with a third threshold temperature (about 760° C.) (S107). If the temperature of the fuel producing means of the fuel processor 2 is higher than the third threshold temperature (about 760° C.), the electric power generation instructing means 5 decreases, as the second power limitation mode, the electric power at a rate that the 100 W is decreased per 4 minutes which is the same as the rate at which the electricity-generating material adjusting device 6 decreases the amount of the electricity-generating material (S108).

The third threshold temperature may be predetermined to be about 20° C. lower than the first threshold temperature to make clear that the temperature of the fuel producing means of the fuel processor 2 is sufficiently lower than the first threshold temperature.

When the temperature of the fuel producing means of the fuel processor 2 is not higher than the third threshold temperature (about 760° C.) in S107, the electric power generation instructing means 5 compares the temperature of the fuel producing means of the fuel processor 2 with a fourth threshold temperature (about 750° C.) (S109). If the temperature of the fuel producing means of the fuel processor 2 is not higher than the fourth threshold temperature (about 750° C.), the second power limitation mode is released and the electric power generation instructing means 5 immediately causes the generated electric power to coincide with the load power (S110). On the other hand, if the temperature of the fuel producing means of the fuel processor 2 is higher than the fourth threshold temperature (about 750° C.) in S109, the second power limitation mode is not released even if the second power limitation mode has been already executed.

As mentioned above, in the case where it is desired to lower the generated electric power in the fuel cell electricity-generating device, when the temperature of the fuel producing means of the fuel processor 2 is higher than the third threshold temperature, the electric power generation instructing means 5 decreases the generated electric power at the same rate as the rate at which the supplied amount of the electricity-generating material is decreased, making it possible to prevent abnormal rise of the temperature of the fuel processor 2.

Further, in the case where the temperature of the fuel producing means of the fuel processor 2 is higher than the first threshold temperature, the electric power generation instructing means 5 prevents the decrease of the generated electric power, making it possible to prevent the fuel processor 2 from rising in temperature to destruction and hence unnecessary suspension of operation of the fuel cell electricity-generating device or deterioration of durability of the fuel processor 2 and even damage of the fuel processor 2.

Moreover, in the case where the temperature of the fuel producing means of the fuel processor 2 is not higher than the second and fourth threshold temperatures, respectively, each of the power limitation modes are then released, making it possible to effect generation of electricity depending on the load power and hence at a high efficiency when the temperature of the fuel processor is normal.

Third Embodiment

Next, a third embodiment of implementation of the present invention will be described in connection with the drawings.

Figure 5:
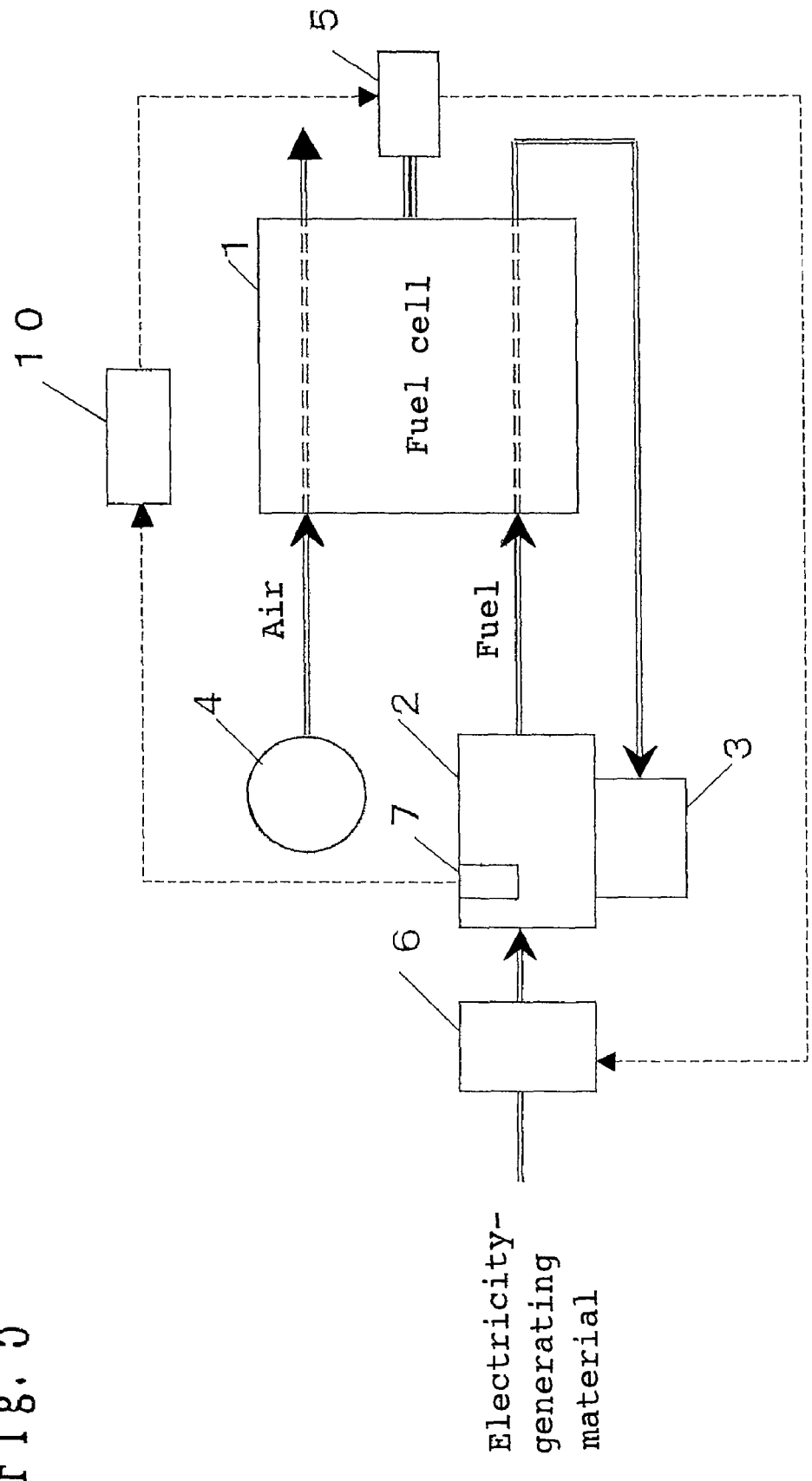
FIG. 5 is a configurational diagram illustrating a fuel cell electricity-generating device according to a third embodiment of implementation of the present invention.

The configuration of the fuel cell system according to the third embodiment of implementation of the present invention is shown in FIG. 5. Where the parts are the same as those of the fuel cell system according to the first embodiment, the same numbers are used and their detailed description are omitted.

The fuel cell electricity-generating device according to the present invention has a fuel cell 1 of generating electricity with a fuel gas and an oxidizer, a fuel processor 2 of producing a fuel rich in hydrogen from an electricity-generating material comprising water incorporated in a natural gas or the like, a combustion device 3 of combusting a residual fuel gas discharged from the fuel cell 1, a blower 4 of supplying air into the fuel cell 1 as an oxidizer, an electric power generation instructing means 5 of adjusting the electric power generated by the fuel cell 1, an electricity-generating material adjusting device 6 of adjusting the amount of electricity-generating material and water to be supplied into the fuel processor 2, a temperature sensing means 7 of sensing the temperature of the fuel producing means of the fuel processor 2 and a temperature comparing means 10 of comparing the temperature detected by the temperature sensing means 7 with first and second threshold values described later, respectively, to judge to see if the temperature detected by the temperature sensing means 7 is higher or not higher than the various threshold values.

The configuration of the fuel cell 1, the fuel processor 2, the combustion device 3, the blower 4, the electric power generation instructing means 5 and the electricity-generating material adjusting device 6 are the same as that of the second embodiment and their description will be omitted.

Next, the operation of the present embodiment will be described focusing on the difference from the second embodiment.

The third embodiment is different from the second embodiment in that only the first power limitation mode is executed but the second power limitation mode is not executed.

In other words, the temperature sensing means 7 detects the temperature of the fuel producing means of the fuel processor 2 in the same manner as in the second embodiment.

The temperature comparing means 10 compares the temperature detected by the temperature sensing means 7 with first and second threshold temperatures described later to judge to see if the temperature detected by the temperature sensing means 7 is higher than or not higher than the various threshold temperatures and then outputs the results of judgment to the electric power generation instructing means 5.

Figure 6:
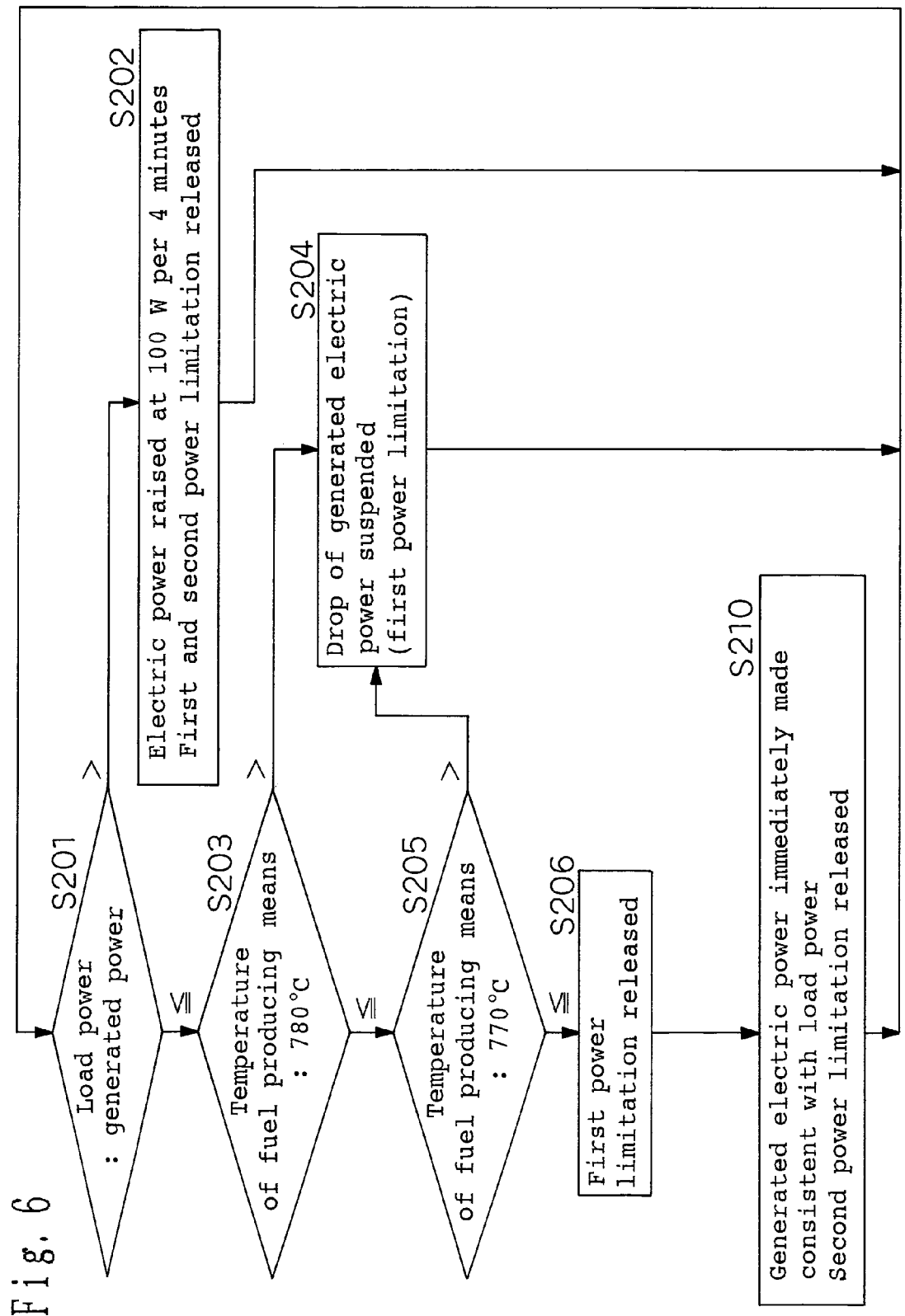
FIG. 6 is a flow chart illustrating the operational state of an electric power generation instructing means 5 according to the third embodiment of implementation of the present invention.

FIG. 6 is a flow chart illustrating the algorithm through which the electric power generation instructing means 5 according to an embodiment of implementation of the present invention changes the generated electric power.

The electric power generation instructing means 5 compares the electric power generated by the fuel cell electricity-generating device with the load power to be supplied (S201). When the load power is greater than the electric power generated by the fuel cell electricity-generating device, the generated electric power is then raised at an upper limit of rate at which the supplied amount of the electricity-generating material can be raised without breaking the temperature balance of the fuel processor 2 (about 20 minutes are required to reach from 50% of rated output to rated output)(S202). When the rated output of the fuel cell electricity-generating device is 1 kW, the electric power is raised at a rate of 100 W per 4 minutes. At the same time, the electricity-generating material adjusting device 6 increases the supplied amount of the electricity-generating material at a rate that the amount corresponding to 100 W is increased per 4 minutes so as to supply the electricity-generating material in an amount required to generate the desired electric power. When a first power limitation mode described later is executed, the power limitation mode which is executed is released at the same time during this process.

On the other hand, when the load power to be supplied is smaller than the electric power generated by the fuel cell electricity-generating device in S201, the electric power generation instructing means 5 compares the temperature of the fuel producing means of the fuel processor 2 with a first threshold temperature (about 780° C.) calculated from the temperature (about 800° C.) at which the catalyst of the fuel producing means is deteriorated taking into account safety (about 20° C.) (S203). If the temperature of the fuel producing means of the fuel processor 2 is higher than the first threshold temperature (about 780° C.), the electric power generation instructing means 5 prevents the decrease of the generated electric power in the first power limitation mode (S204). At the same time, the electricity-generating material adjusting device 6 decreases the supplied amount of the electricity-generating material at a rate that the amount corresponding to 100 W is decreased per 4 minutes.

When the temperature of the fuel producing means of the fuel processor 2 is not higher than the first threshold temperature (about 780° C.) in S203, the electric power generation instructing means 5 compares the temperature of the fuel producing means of the fuel processor 2 with the second threshold temperature (about 770° C.) (S205). If the temperature of the fuel producing means of the fuel processor 2 is not higher than the second threshold temperature (about 770° C.), the first power limitation mode is released (S206). The electric power generation instructing means 5 immediately causes the generated electric power to coincide with the load power (S210).

On the other hand, if the temperature of the fuel producing means of the fuel processor 2 is higher than the second threshold temperature (about 770° C.) in S105, the first power limitation mode is not released even if the first power limitation mode has been already executed (S204). The second threshold temperature is determined taking into account the rate of change of temperature of the fuel producing means of the fuel processor 2 so that the execution/release of the first power limitation mode doesn't occur little by little but may be normally predetermined to be about 10° C. lower than the first threshold temperature.

As mentioned above, when the temperature of the fuel producing means of the fuel processor 2 is higher than the first threshold temperature, the electric power generation instructing means 5 prevents the decrease of the generated electric power, making it possible to prevent the fuel processor 2 from rising in temperature to destruction and hence unnecessary suspension of operation of the fuel cell electricity-generating device or deterioration of durability of the fuel processor 2 and even damage of the fuel processor 2.

Further, when the temperature of the fuel producing means of the fuel processor 2 is not higher than the second threshold temperature, the first power limitation mode is released, making it possible to effect generation of electricity depending on the load power and hence at a high efficiency when the temperature of the fuel processor is normal.

Thus, even in the case where only the first power limitation mode is executed but the second power limitation mode is not executed, the same effect as exerted in the second embodiment can be exerted.

Fourth Embodiment

Next, a fourth embodiment of implementation of the present invention will be described in connection with the drawings.

Figure 7:
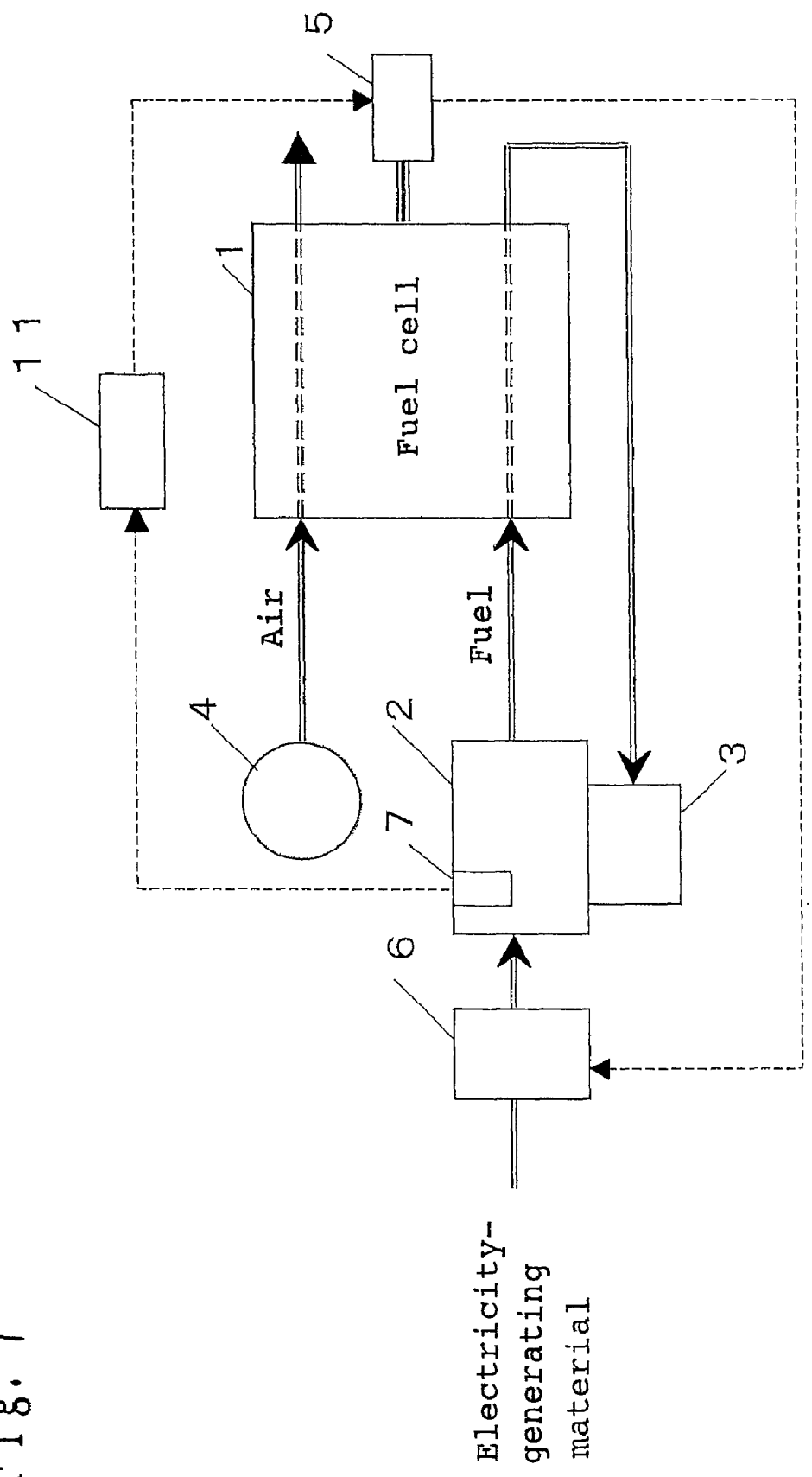
FIG. 7 is a configurational diagram illustrating a fuel cell electricity-generating device according to a fourth embodiment of implementation of the present invention.

The configuration of the fuel cell system according to the fourth embodiment of implementation of the present invention is shown in FIG. 7. Where the parts are the same as those of the fuel cell system according to the first embodiment, the same numbers are used and their detailed description are omitted.

The fuel cell electricity-generating device according to the present invention has a fuel cell 1 of generating electricity with a fuel gas and an oxidizer, a fuel processor 2 of producing a fuel rich in hydrogen from an electricity-generating material comprising water incorporated in a natural gas or the like, a combustion device 3 of combusting a residual fuel gas discharged from the fuel cell 1, a blower 4 of supplying air into the fuel cell 1 as an oxidizer, an electric power generation instructing means 5 of adjusting the electric power generated by the fuel cell 1, an electricity-generating material adjusting device 6 of adjusting the amount of electricity-generating material and water to be supplied into the fuel processor 2, a temperature sensing means 7 of sensing the temperature of the fuel producing means of the fuel processor 2 and a temperature comparing means 11 of comparing the temperature detected by the temperature sensing means 7 with third and fourth threshold values described later, respectively, to judge to see if the temperature detected by the temperature sensing means 7 is higher or not higher than the various threshold values.

The configuration of the fuel cell 1, the fuel processor 2, the combustion device 3, the blower 4, the electric power generation instructing means 5 and the electricity-generating material adjusting device 6 are the same as that of the second embodiment and their description will be omitted.

Next, the operation of the present embodiment will be described focusing on the difference from the second embodiment.

The fourth embodiment is different from the second embodiment in that only the second power limitation mode is executed but the first power limitation mode is not executed.

In other words, the temperature sensing means 7 detects the temperature of the fuel producing means of the fuel processor 2.

The temperature comparing means 11 compares the temperature detected by the temperature sensing means 7 with third and fourth threshold temperatures described later to judge to see if the temperature detected by the temperature sensing means 7 is higher than or not higher than the various threshold temperatures and then outputs the results of judgment to the electric power generation instructing means 5.

Figure 8:
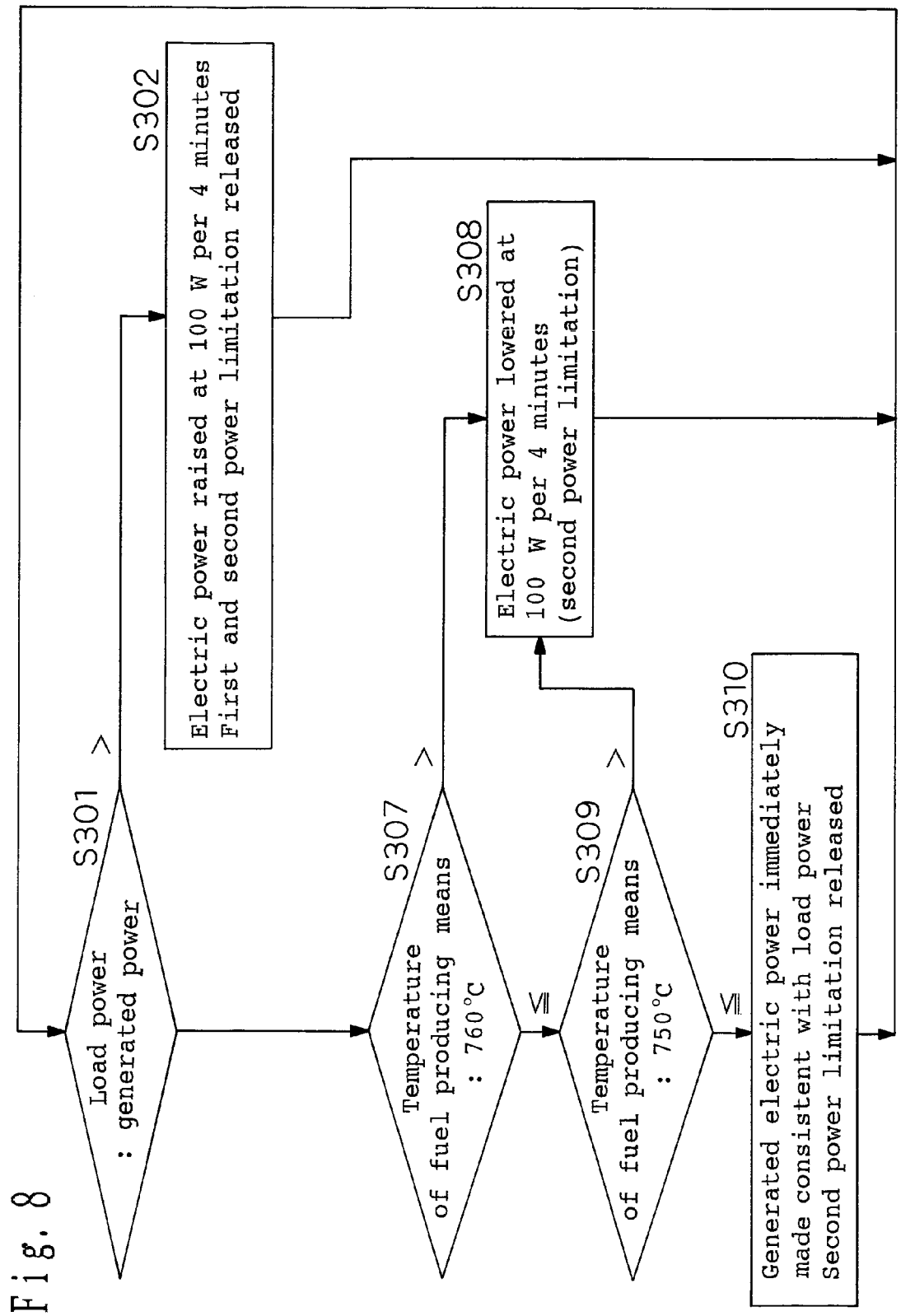
FIG. 8 is a flow chart illustrating the operational state of an electric power generation instructing means 5 according to the fourth embodiment of implementation of the present invention.
Figure 9:
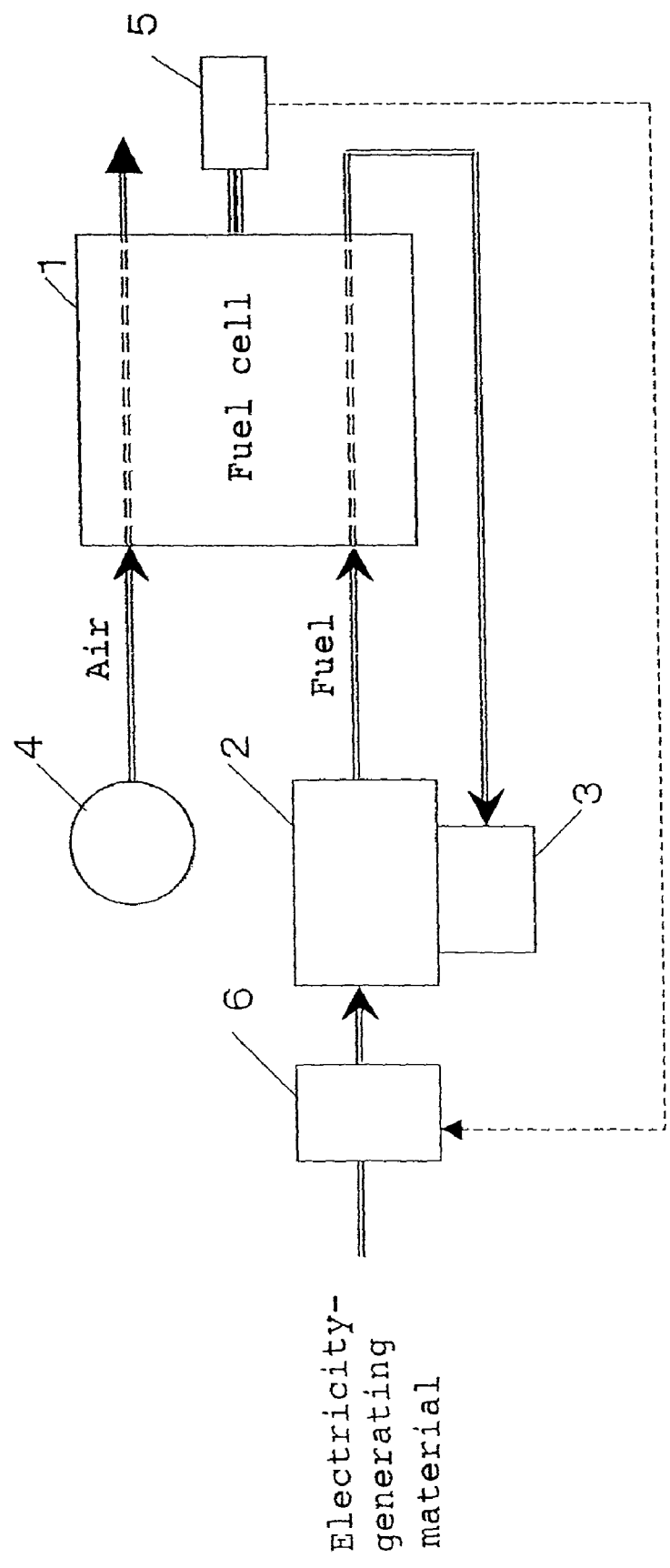
FIG. 9 is a configurational diagram illustrating a prior art fuel cell electricity-generating device.

FIG. 8 is a flow chart illustrating the algorithm through which the electric power generation instructing means 5 according to an embodiment of implementation of the present invention changes the generated electric power.

The electric power generation instructing means 5 compares the electric power generated by the fuel cell electricity-generating device with the load power to be supplied (S301). When the load power is greater than the electric power generated by the fuel cell electricity-generating device, the generated electric power is then raised at an upper limit of rate at which the supplied amount of the electricity-generating material can be raised without breaking the temperature balance of the fuel processor 2 (about 20 minutes are required to reach from 50% of rated output to rated output) (S302). When the rated output of the fuel cell electricity-generating device is 1 kW, the electric power is raised at a rate of 100 W per 4 minutes. At the same time, the electricity-generating material adjusting device 6 increases the supplied amount of the electricity-generating material at a rate that the amount corresponding to 100 W is increased per 4 minutes so as to supply the electricity-generating material in an amount required to generate the desired electric power. When a second power limitation mode described later is executed, the power limitation mode which is executed is released at the same time during this process.

On the other hand, when the load power to be supplied is smaller than the electric power generated by the fuel cell electricity-generating device in S301, the electric power generation instructing means 5 compares the temperature of the fuel producing means of the fuel processor 2 with the third threshold temperature (about 760° C.) (S307). If the temperature of the fuel producing means of the fuel processor 2 is higher than the third threshold temperature (about 760° C.), the electric power generation instructing means 5 decreases the generated electric power at a rate of 100 W per 4 minutes, which is the same as the rate at which the electricity-generating material adjusting device 6 decreases the amount of the electricity-generating material, in the second power limitation mode (S308).

The third threshold temperature may be predetermined to be about 20° C. lower than 780° C. so that the temperature of the fuel producing means of the fuel processor 2 is sufficiently lower than the temperature (about 780° C.) calculated from the temperature (about 800° C.) at which the catalyst of the fuel producing means is deteriorated taking into account safety (about 20° C.).

When the temperature of the fuel producing means of the fuel processor 2 is not higher than the third threshold temperature (about 760° C.) in S307, the electric power generation instructing means 5 compares the temperature of the fuel producing means of the fuel processor 2 with the fourth threshold temperature (about 750° C.) (S309). If the temperature of the fuel producing means of the fuel processor 2 is not higher than the fourth threshold temperature (about 750° C.), the second power limitation mode is released and the electric power generation instructing means 5 immediately causes the generated electric power to coincide with the load power (S310). On the other hand, if the temperature of the fuel producing means of the fuel processor 2 is higher than the fourth threshold temperature (about 750° C.) in S309, the second power limitation mode is not released even if the second power limitation mode has been already executed.

As mentioned above, in the case where it is desired to lower the generated electric power in the fuel cell electricity-generating device, when the temperature of the fuel producing means of the fuel processor 2 is higher than the third threshold temperature, the electric power generation instructing means 5 decreases the generated electric power at the same rate as the rate at which the supplied amount of the electricity-generating material is decreased, making it possible to prevent abnormal rise of the temperature of the fuel processor 2.

Moreover, in the case where the temperature of the fuel producing means of the fuel processor 2 is not higher than the fourth threshold temperature, the second power limitation mode is then released, making it possible to effect generation of electricity depending on the load power and hence at a high efficiency when the temperature of the fuel processor is normal.

Thus, the same effect as exerted in the second embodiment can be exerted even if the first power limitation mode is not executed but only the second power limitation mode is executed.

While the first to fourth embodiments have been described with reference to the case where the rate at which the electric power generation instructing means 5 raises the electric power is 100 W per 4 minutes, this rate should be changed if the configuration and heat capacity of the fuel processor vary, but such other cases still fall within the scope of the present invention. In other words, the rate at which the electric power generation instructing means 5 raises the generated electric power depends on the configuration of the fuel processor 2 but may be such that the carbon oxide removing means constituting the fuel processor 2 falls within the range of appropriate temperatures. When the rate falls within this range, the temperature of the carbon oxide removing means falls within the range of appropriate temperature, causing the content of carbon monoxide in the output of the carbon oxide removing means to fall below an appropriate amount. In other words, the rate at which the electric power generation instructing means 5 raises the generated electric power may be such that the content of carbon monoxide in the output of the carbon oxide removing means is not higher than an appropriate value. For example, so far as a device which tolerates the concentration of carbon monoxide to 20 ppm is used, the rate may be such that the content of carbon monoxide in the output of the carbon oxide removing means is not higher than 20 ppm.

While the second to fourth embodiments have been described with reference to the case where the first, second, third and fourth threshold values are derived from a catalyst mainly composed of ruthenium as the catalyst of the fuel processor, the present invention is not limited thereto if other catalysts are used in the fuel processor. Further, if the heat capacity of the fuel processor is great, it is appropriate that the temperature of the fuel processor is predetermined higher. On the contrary, if the heat capacity of the fuel processor is small, it is appropriate that the temperature of the fuel processor is predetermined lower. Even such cases fall within the scope of the present invention.

As made obvious from the aforementioned description, the present invention can provide a stable high reliability fuel cell electricity-generating device, and a fuel cell electricity-generating method.

The invention claimed is:

1. A method for operating a fuel cell electricity-generating apparatus, comprising steps of:
   generating electric power by a fuel cell using a fuel gas and an oxidizer;
   producing, by a fuel processor, the fuel gas from an electricity-generating material;
   raising, by a combustion device, a temperature of the fuel processor using a residual fuel gas unconsumed in the fuel cell;
   decreasing, when load power is decreasing, the electric power generated by the fuel cell at a rate within a predetermined upper limit if the temperature of the fuel processor is not lower than a certain threshold value; and
   decreasing, when the load power is decreasing, the electric power generated by the fuel cell at a rate absent the predetermined upper limit so that the generated electric power coincides with the load power, if the temperature of the fuel processor is not higher than another threshold value which is lower than the certain threshold value.

2. The method according to claim 1, wherein the step of decreasing the electric power generated by the fuel cell at a rate within the predetermined upper limit is not executed when the electric power generated by the fuel cell is maintained or begins to be raised.

3. The method according to claim 1,
   further comprising a step of preventing, when the load power is decreasing, the electric power generated by the fuel cell from decreasing if the temperature of the fuel processor is not lower than still another threshold value which is higher than the certain threshold value.

4. The method according to claim 3, wherein the step of preventing the electric power generated by the fuel cell from decreasing is not executed when the electric power generated by the fuel cell is maintained or begins to be raised.

* * * * *